US012698903B2

(12) United States Patent
Wu

(10) Patent No.: US 12,698,903 B2
(45) Date of Patent: Aug. 4, 2026

(54) DETACHABLE SECONDARY INCINERATOR

(71) Applicant: ZHEJIANG PAN AN CHERRY HARDWARE CO., LTD, Jinhua (CN)

(72) Inventor: Ruiwei Wu, Yongkang (CN)

(73) Assignee: ZHEJIANG PAN AN CHERRY HARDWARE CO., LTD, Jinhua (CN)

( * ) Notice: Subject to any disclaimer, the term of this patent is extended or adjusted under 35 U.S.C. 154(b) by 429 days.

(21) Appl. No.: 18/508,476

(22) Filed: Nov. 14, 2023

(65) Prior Publication Data

US 2024/0328627 A1 Oct. 3, 2024

(30) Foreign Application Priority Data

Mar. 27, 2023 (CN) .......................... 202320702344.1

(51) Int. Cl.
| | |
|---|---|
| *F24C 1/16* | (2021.01) |
| *A47J 33/00* | (2006.01) |
| *F23B 90/06* | (2011.01) |
| *F24B 1/20* | (2006.01) |
| *F24B 3/00* | (2006.01) |
| *F24B 5/02* | (2006.01) |

(52) U.S. Cl.
CPC ................ *F24C 1/16* (2013.01); *F24B 5/025* (2013.01); *F24B 5/026* (2013.01); *A47J 33/00* (2013.01); *F23B 90/06* (2013.01); *F24B 1/202* (2013.01); *F24B 3/00* (2013.01)

(58) Field of Classification Search
CPC .. F24B 3/00; F24B 1/205; F24B 1/202; F23B 20/00; F23B 2700/018; F23B 90/06; F23L 9/02; F23L 1/00
See application file for complete search history.

(56) References Cited

U.S. PATENT DOCUMENTS

| | | | | |
|---|---|---|---|---|
| 1,634,517 A | * | 7/1927 | Rotstein | .................. F24B 1/202 126/9 R |
| 5,535,733 A | * | 7/1996 | Hait | ........................ F24B 1/202 126/26 |
| D942,202 S | * | 2/2022 | Kim | ............................... D7/337 |
| D965,123 S | * | 9/2022 | Heller | ........................... D23/343 |

(Continued)

FOREIGN PATENT DOCUMENTS

| | | | | |
|---|---|---|---|---|
| KR | 20170002517 U | * | 7/2017 | ................ F24B 3/00 |
| KR | 102485585 B1 | * | 1/2023 | .............. F24B 1/193 |

*Primary Examiner* — Jorge A Pereiro
(74) *Attorney, Agent, or Firm* — Birchwood IP

(57) ABSTRACT

A detachable secondary incinerator is provided, which includes a furnace body and a base. The furnace body and the base are detachably connected; the base is provided with a fence; first ventilation ports are formed in the fence; the base is further provided with a first ventilation chamber; and second ventilation ports and third ventilation ports are respectively formed in the first ventilation chamber. The furnace body includes a limiting plate; when the furnace body is spliced with the base, the limiting plate is inserted between the fence and the first ventilation chamber; a bottom end of the limiting plate is suspended; the limiting plate partially covers or is separated from the first ventilation ports or forms a gap with the fence; and the limiting plate partially covers or is separated from the second ventilation ports or forms a gap with the side wall of the first ventilation chamber.

8 Claims, 6 Drawing Sheets

(56)             References Cited

U.S. PATENT DOCUMENTS

| | | | |
|---|---|---|---|
| 11,668,467 B2 * | 6/2023 | DeSpain ................... | F24C 1/16 |
| | | | 126/9 B |
| 2005/0274372 A1 * | 12/2005 | Knight ................... | F24B 1/202 |
| | | | 126/38 |
| 2021/0048188 A1 * | 2/2021 | Harrington ............ | F23B 20/00 |

* cited by examiner

DETACHABLE SECONDARY INCINERATOR

TECHNICAL FIELD

The present disclosure relates to the field of stoves, and in particular, to a detachable secondary incinerator.

BACKGROUND

Nowadays, outdoor camping is becoming more and more popular among the public. Due to the wide source of firewood, many people will take an incinerator when they go camping, which has the advantages of simple structure, portability and so on.

In order to achieve the effect of introducing air to the bottom of the burning wood, a general incinerator is provided with a ventilation channel at the bottom, which is bound to suspend the furnace body, making it inconvenient to use due to occupying a large space during use. In order to facilitate the carrying and storage of the incinerator, the incinerator is generally designed to be detachable. If the furnace body needs to be suspended, support legs on the incinerator increase the structural complexity of the incinerator and increase the difficulty of detaching the incinerator. How to design an incinerator with simple structure, convenient use, and the ability to realize ventilation at the bottom of the furnace body is still a problem to be solved by designers.

SUMMARY

To solve the above problems, the present disclosure proposes a detachable secondary incinerator, which solves the problem of complex structure and inconvenient use caused by the suspension of the furnace body of the incinerator on the premise of realizing the ventilation at the bottom of the furnace body.

The technical solution adopted by the present disclosure is: a detachable secondary incinerator, which includes a furnace body and a base. The furnace body and the base are detachably connected. The base is provided with a fence, and first ventilation ports are formed in the fence. The base is further provided with a first ventilation chamber located on an inner side of the fence, and second ventilation ports and third ventilation ports are respectively formed in a side wall and a top surface of the first ventilation chamber.

The furnace body includes a limiting plate. When the furnace body is spliced with the base, the limiting plate is inserted between the fence and the side wall of the first ventilation chamber. A bottom end of the limiting plate is suspended. The limiting plate partially covers the first ventilation ports or is separated from the first ventilation ports or forms a gap with the fence; and the limiting plate partially covers the second ventilation ports or is separated from the second ventilation ports or forms a gap with the side wall of the first ventilation chamber.

Through the above technical solution, according to the present disclosure, the furnace body and the base are connected with each other during use, and a chamber for combustion is formed between the furnace body and the base. External air can be introduced to a space above the base through the first ventilation ports, the second ventilation ports, and the third ventilation ports to support combustion, and the limiting plate will not block the inflow of air. According to the present disclosure, the base is directly connected with the furnace body, and the furnace body is not suspended, which realizes ventilation at the bottom of the furnace body while making the structure simpler and more convenient to use. The arrangement of the limiting plate avoids the transition deviation between the furnace body and the base in the horizontal direction, making the use state more stable.

Further, the furnace body includes a limiting surface, and when the furnace body is spliced with the base, the limiting surface abuts against a top end of the fence.

Through the above technical solution, according to the present disclosure, during installation, it only needs to align and insert the limiting plate between the fence and the first ventilation chamber, and the top end of the fence abuts against the limiting surface to support the overall weight of the furnace body.

Further, the furnace body is provided with a second ventilation chamber in a circumferential direction, and fourth ventilation ports and fifth ventilation ports are respectively formed in the second ventilation chamber. The fourth ventilation ports are formed in the limiting surface, and the fifth ventilation ports are formed in an upper part of an inner wall of the second ventilation chamber. When the furnace body is spliced with the base, the fence is located at inner sides of the fourth ventilation ports.

Through the above technical solution, external air can sequentially pass through the fourth ventilation ports, the second ventilation chamber, and the fifth ventilation ports to flow to the upper part of the interior of the furnace body to support combustion, making fuel combustion efficiency in the furnace body higher. The fence is located at the inner sides of the fourth ventilation ports, which avoids obstruction of the fence to the inflow of air from the fourth ventilation ports.

Further, the furnace body is provided with a second ventilation chamber in a circumferential direction, and fourth ventilation ports and fifth ventilation ports are respectively formed in the second ventilation chamber. The fourth ventilation ports are formed in a lower part of an outer wall of the second ventilation chamber, and the fifth ventilation ports are formed in an upper part of an inner wall of the second ventilation chamber.

Through the above technical solution, external air can sequentially pass through the fourth ventilation ports, the second ventilation chamber, and the fifth ventilation ports to flow to the upper part of the interior of the furnace body to support combustion, making fuel combustion efficiency in the furnace body higher.

Further, the present disclosure further includes partition plates, the furnace body is surrounded and formed by the partition plates via end-to-end connection, and the second ventilation chamber is arranged inside the partition plates.

Through the above technical solution, the furnace body can be further disassembled, making the volume of the present disclosure smaller after disassembly and further facilitating the carrying and storage.

Further, the partition plate includes an outer side wall; abutting walls are arranged on both sides of the partition plate; and a connecting surface is arranged between the outer side wall and the abutting wall. The connecting surface and the abutting wall are perpendicular to each other, and the connecting surfaces on adjacent partition plates are coplanar.

Through the above technical solution, a connected portion between the adjacent partition plates does not produce a sharp shape, avoiding scratching the human body at the connection of the adjacent partition plates, so as to make use safer.

Further, the furnace body and the base are both in a shape of an appropriate regular polygon, the first ventilation ports and the second ventilation ports are evenly arranged and equal in number in the fence and a side surface of the first ventilation chamber; or the furnace body and the base are both in a shape of an appropriate circle, and the first ventilation ports and the second ventilation ports are evenly arranged in a circumferential direction.

Through the above technical solution, the base is communicated with the external air to the same extent in the circumferential direction, making the effect of utilizing air to support combustion above the top surface of the first ventilation chamber more uniform and combustion more thorough.

Further, a plurality of third ventilation ports are evenly and densely arranged in the top surface of the first ventilation chamber.

Through the above technical solution, the ventilation effect at the top surface of the first ventilation chamber is more uniform, making the combustion efficiency higher and the combustion more thorough.

Further, a top of the furnace body is provided with a fireproof plate arranged obliquely to the inside.

Through the above technical solution, the temperature loss in the furnace body is reduced, the energy loss is reduced, and the amount of firewood required is reduced, making the top flame more concentrated, so as to make the combustion efficiency higher; and the flames are prevented from spraying to the side, so as to avoid burns caused by human contact.

BRIEF DESCRIPTION OF THE DRAWINGS

To describe the technical solutions in the examples of the present disclosure or in existing technologies more clearly, the accompanying drawings required for describing the examples or existing technologies are briefly described below. Apparently, the accompanying drawings in the following description show some examples of the present disclosure, and a person of ordinary skill in the art may still derive other drawings from these accompanying drawings without creative efforts.

LIST OF REFERENCE NUMERALS

Figure 1:
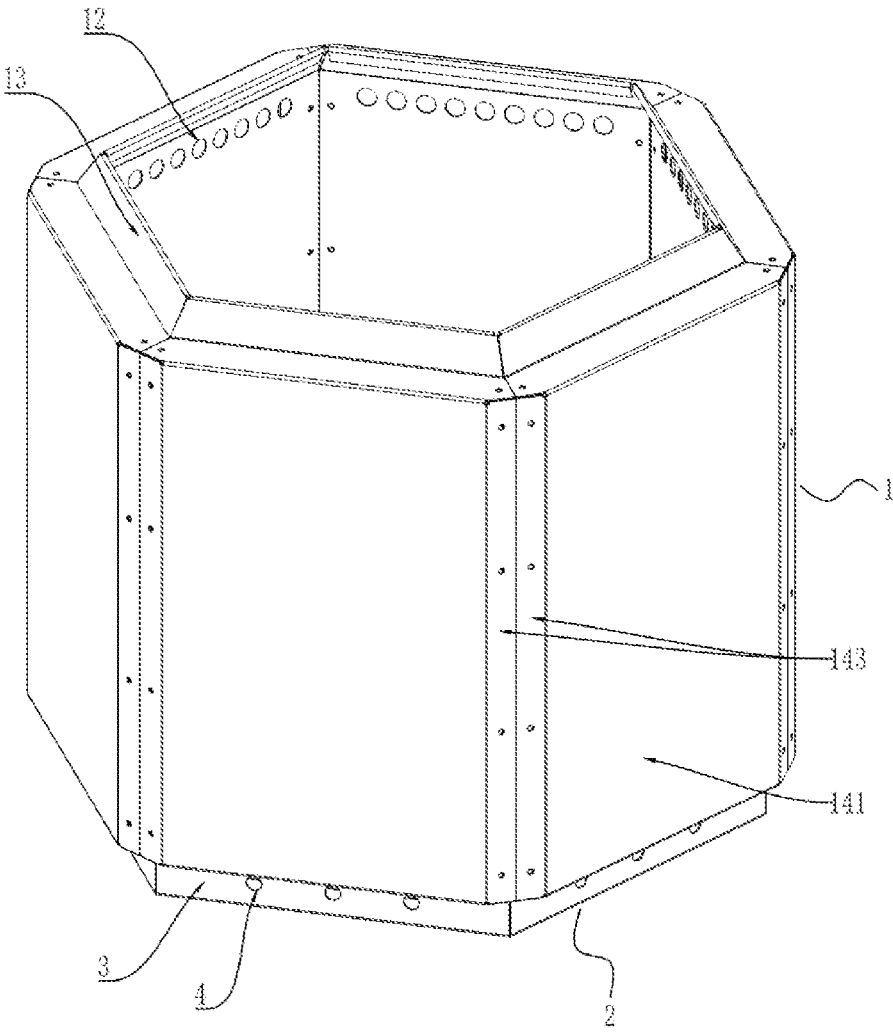
FIG. 1 is a schematic structural diagram of the present disclosure.

1: furnace body; 2: base; 3: fence; 4: first ventilation port; 5: first ventilation chamber; 6: second ventilation port; 7: third ventilation port; 8: limiting plate; 9: limiting surface; 10: second ventilation chamber; 11: fourth ventilation port; 12: fifth ventilation port; 13: fireproof plate; 14: partition plate; 141: outer side wall; 142: abutting wall; and 143: connecting surface.

The implementation, functional features, and advantages of the present disclosure will be further explained in conjunction with the examples and with reference to the accompanying drawings.

DETAILED DESCRIPTION

The following clearly and completely describes the technical solutions in the examples of the present disclosure with reference to the accompanying drawings in the examples of the present disclosure. Apparently, the described examples are some of the examples of the present disclosure rather than all of the examples. All other examples obtained by those of ordinary skill in the art based on the examples of the present disclosure without making creative efforts shall fall within the protection scope of the present disclosure.

In addition, descriptions involving "first", "second" and the like in the present disclosure are used only for descriptive purposes and cannot be understood as indicating or implying their relative importance or implicitly specifying the number of technical features indicated. Therefore, features defined with "first" and "second" can explicitly or implicitly include at least one of these features. In addition, the technical solutions of various examples can be combined with each other, but only on the basis that they can be implemented by those of ordinary skill in the art. When the combination of technical solutions conflicts or cannot be achieved, it should be considered that such combination of technical solutions does not exist and is not within the protection scope required by the present disclosure.

As shown in FIGS. 1, 2, 3, 4 and 6: a detachable secondary incinerator includes a furnace body 1 and a base 2. The furnace body 1 and the base 2 are detachably connected. The base 2 is provided with a fence 3, and first ventilation ports 4 are formed in the fence 3. The base 2 is further provided with a first ventilation chamber 5 located on an inner side of the fence 3, and second ventilation ports 6 and third ventilation ports 7 are respectively formed in a side wall and a top surface of the first ventilation chamber 5. The furnace body 1 includes a limiting plate 8. When the furnace body 1 is spliced with the base 2, the limiting plate 8 is inserted between the fence 3 and the side wall of the first ventilation chamber 5. A bottom end of the limiting plate 8 is suspended. The limiting plate 8 partially covers the first ventilation ports 4 or is separated from the first ventilation ports 4 or forms a gap with the fence 3; and the limiting plate 8 partially covers the second ventilation ports 6 or is separated from the second ventilation ports 6 or forms a gap with the side wall of the first ventilation chamber 5.

According to the present disclosure, the furnace body 1 and the base 2 are connected with each other during use, and a chamber for combustion is formed between the furnace body 1 and the base 2. External air can be introduced to a space above the base 2 through the first ventilation ports 4, the second ventilation ports 6, and the third ventilation ports 7 to support combustion, and the limiting plate 8 will not block the inflow of air. According to the present disclosure, the base 2 is directly connected with the furnace body 1, and the furnace body 1 is not suspended, which realizes ventilation at the bottom of the furnace body 1 while making the structure simpler and more convenient to use. The arrangement of the limiting plate 8 avoids the transition deviation between the furnace body 1 and the base 2 in the horizontal direction, making the use state more stable.

The first ventilation ports 4, the second ventilation ports 6, and the third ventilation ports 7 can be in the shape of a hole, a grid, and a filter network. In the present disclosure, the first ventilation ports 4, the second ventilation ports 6, and the third ventilation ports 7 are preferably in the shape of a hole, which is simple in structure and the difficulties of production and cleaning are reduced.

According to the present disclosure, it is preferred that when the furnace body 1 and the base 2 are connected and the limiting plate 8 extends into the fence 3 and a side surface of the first ventilation chamber 5, a gap is formed between the limiting plate 8 and the fence 3, and a gap for the inflow of air is formed between the limiting plate 8 and the side surface of the first ventilation chamber 5, which makes the gas exchange rate inside and outside the furnace body 1 faster and improves the combustion efficiency.

As shown in FIGS. 2, 3, 4 and 5: the furnace body 1 includes a limiting surface 9, and when the furnace body 1 is spliced with the base 2, the limiting surface 9 abuts against a top end of the fence 3. According to the present disclosure, during installation, it only needs to align and insert the limiting plate 8 between the fence 3 and the first ventilation chamber 5, and the top end of the fence 3 abuts against the limiting surface 9 to support the overall weight of the furnace body 1.

The furnace body 1 is provided with a second ventilation chamber 10 in a circumferential direction, and fourth ventilation ports 11 and fifth ventilation ports 12 are respectively formed in the second ventilation chamber 10. There are two implementations for position arrangement of the ventilation ports 11 and the fifth ventilation ports 12 in the present disclosure, which are as follows:

Example 1: as shown in FIGS. 1, 2, 3 and 4: the fourth ventilation ports 11 are formed in the limiting surface 9, and the fifth ventilation ports 12 are formed in an upper part of an inner wall of the second ventilation chamber 10. When the furnace body 1 is spliced with the base 2, the fence 3 is located at inner sides of the fourth ventilation ports 11. External air can sequentially pass through the fourth ventilation ports 11, the second ventilation chamber 10, and the fifth ventilation ports 12 to flow to the upper part of the interior of the furnace body 1 to support combustion, which makes fuel combustion efficiency in the furnace body 1 higher. The fence 3 is located at the inner sides of the fourth ventilation ports 11, which avoids obstruction of the fence 3 to the inflow of air from the fourth ventilation ports 11.

Example 2: the fourth ventilation ports 11 are formed in a lower part of an outer wall of the second ventilation chamber 10, and the fifth ventilation ports 12 are formed in an upper part of an inner wall of the second ventilation chamber 10. External air can sequentially pass through the fourth ventilation ports 11, the second ventilation chamber 10, and the fifth ventilation ports 12 to flow to the upper part of the interior of the furnace body 1 to support combustion, which makes fuel combustion efficiency in the furnace body 1 higher.

Example 1 is preferred in the present disclosure, and the following description is applicable to both examples 1 and 2.

The furnace body 1 and the base 2 are both in a shape of an appropriate regular polygon, the first ventilation ports 4 and the second ventilation ports 6 are evenly arranged and equal in number in the fence 3 and the side surface of the first ventilation chamber 5; or the furnace body 1 and the base 2 are both in a shape of an appropriate circle, and the first ventilation ports 4 and the second ventilation ports 6 are evenly arranged in the circumferential direction, so that the base 2 is communicated with the external air to the same extent in the circumferential direction, making the effect of utilizing air to support combustion above the top surface of the first ventilation chamber 5 more uniform and the combustion more thorough.

The furnace body 1 and the base 2 are preferably in the shape of a regular hexagon in the present disclosure.

A plurality of third ventilation ports 7 are evenly and densely arranged in the top surface of the first ventilation chamber 5. The ventilation effect at the top surface of the first ventilation chamber 5 is more uniform, which makes the combustion efficiency higher and the combustion more thorough.

A top of the furnace body 1 is provided with a fireproof plate 13 arranged obliquely to the inside. The temperature loss in the furnace body 1 is reduced, the energy loss is reduced, and the amount of firewood required is reduced, which makes the top flame more concentrated, so as to make the combustion efficiency higher; and the flames are prevented from spraying to the side, so as to avoid burns caused by human contact.

Figure 2:
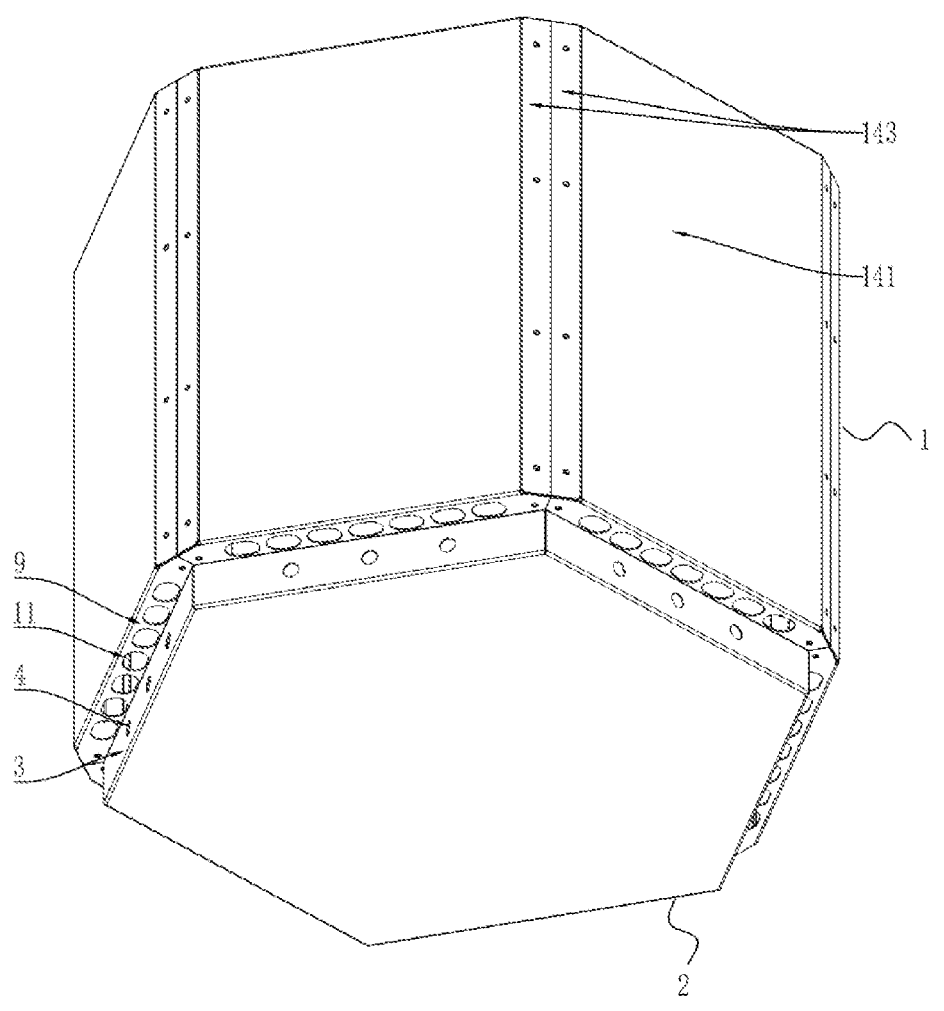
FIG. 2 is another schematic structural diagram of the present disclosure.
Figure 3:
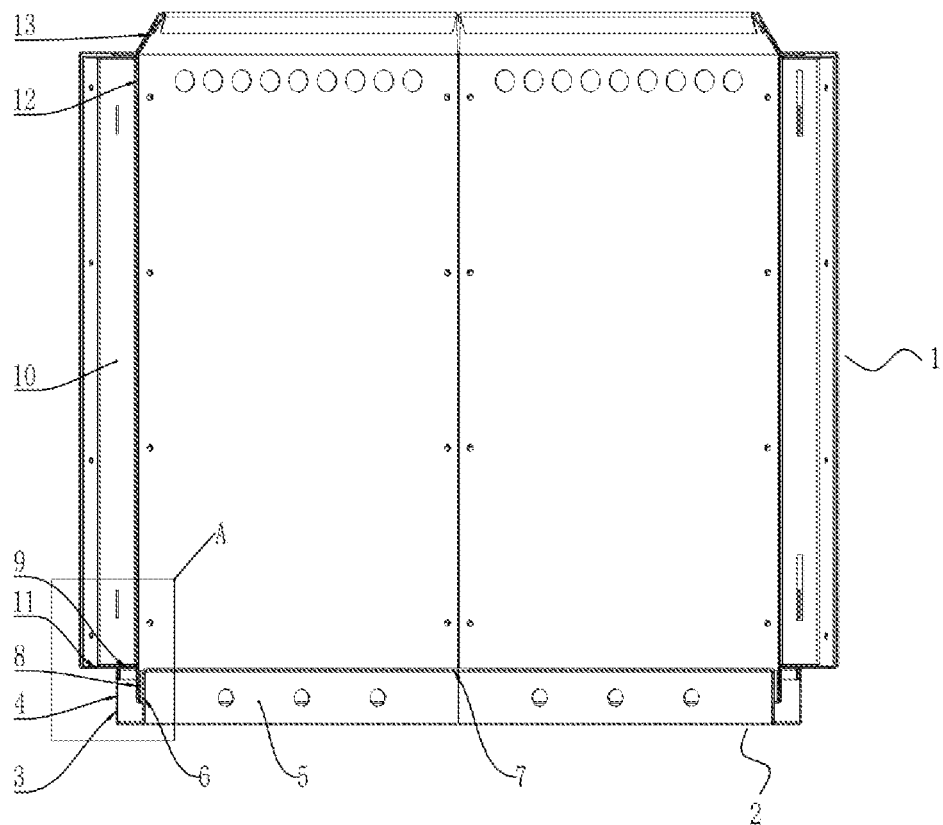
FIG. 3 is a schematic diagram of an internal structure of the present disclosure.
Figure 4:
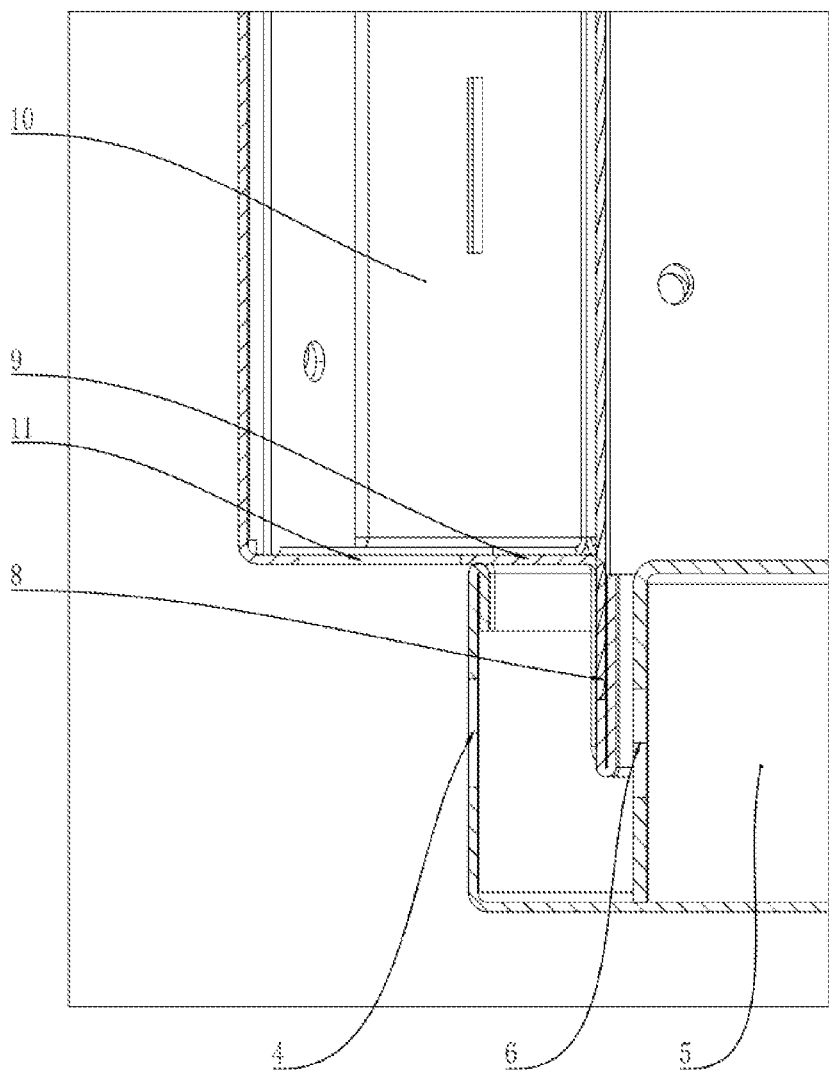
FIG. 4 is a partially enlarged view of point A in FIG. 3.
Figure 5:
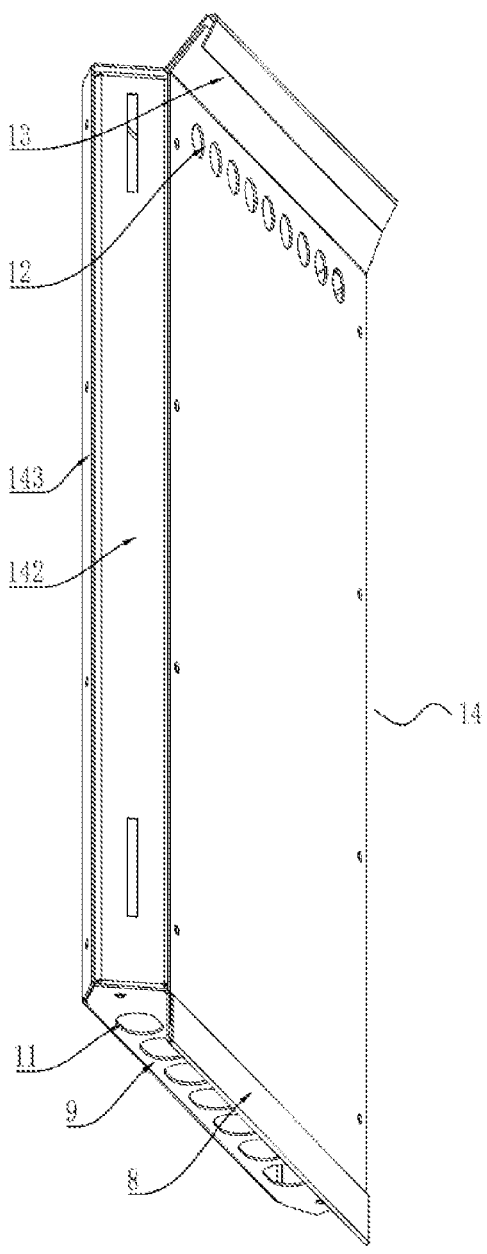
FIG. 5 is a schematic structural diagram of a partition plate of the present disclosure.
Figure 6:
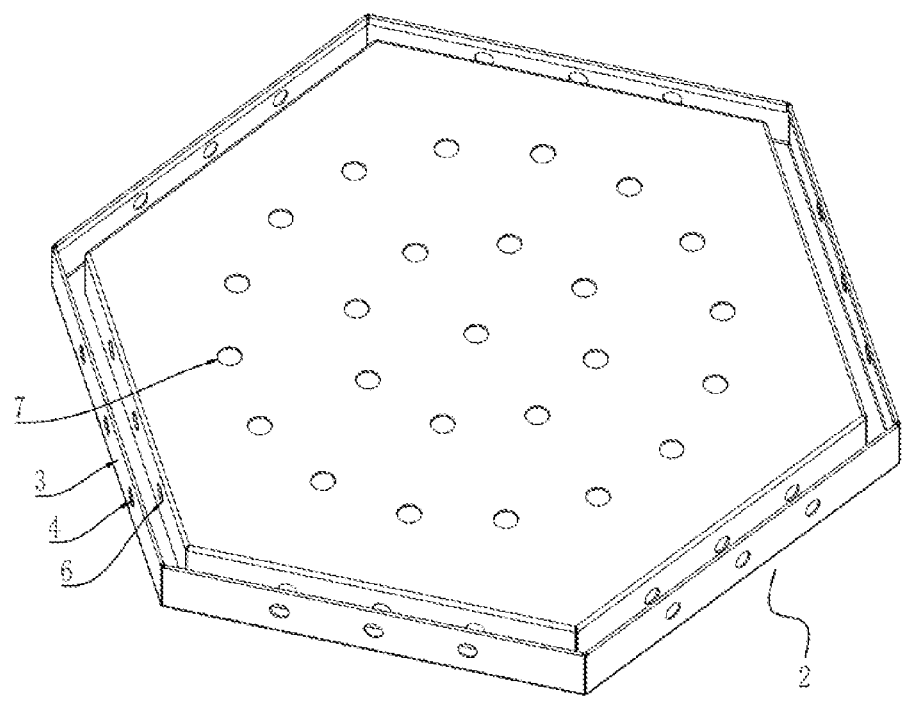
FIG. 6 is a schematic structural diagram of a base of the present disclosure.

As shown in FIGS. 1, 2 and 5: the present disclosure further includes partition plates 14, the furnace body 1 is surrounded and formed by the partition plates 14 via end-to-end connection, and the second ventilation chamber 10 is arranged inside the partition plates 14, so that the furnace body 1 can be further disassembled, making the volume of the present disclosure smaller after disassembly and further facilitating the carrying and storage.

The partition plate 14 includes an outer side wall 141; abutting walls 142 are arranged on both sides of the partition plate 14; and a connecting surface 143 is arranged between the outer side wall 141 and the abutting wall 142. The connecting surface 143 and the abutting wall 142 are perpendicular to each other; and the connecting surfaces 143 on adjacent partition plates 14 are coplanar, so that a connected portion between the adjacent partition plates 14 does not produce a sharp shape, which avoids scratching the human body at the connection of the adjacent partition plates 14, so as to make use safer.

As shown in FIG. 1 to FIG. 6, during the use of the present disclosure, each partition plates 14 is spliced with each other to form the furnace body 1, and then the furnace body 1 is aligned and placed on the base 2.

External air can flow into the furnace body 1 from three paths. The first one is that external air sequentially passes through the first ventilation ports 4, the second ventilation ports 6, and the first ventilation chamber 5 and flows out from third ventilation holes; the second one is that external air passes through the first ventilation ports 4 and then flows into the furnace body 1 from the gap between the limiting plate 8 and the side surface of the first ventilation chamber 5; and the third one is that external air sequentially passes through the fourth ventilation ports 11, the second ventilation chamber 10, and the fifth ventilation ports 12 and enters into the furnace body 1.

The above are only preferred examples of the present disclosure and do not therefore limit the patent scope of the present disclosure. Any equivalent structural changes made by using the contents of the specification and the accompanying drawings of the present disclosure, or direct/indirect applications in other related technical fields under the inventive concept of the present disclosure, are included in the patent protection scope of the present disclosure.

What is claimed is:

1. A detachable secondary incinerator, comprising: a furnace body and a base, wherein the furnace body and the base are detachably connected, the base is provided with a fence, first ventilation ports are formed in the fence, the base is further provided with a first ventilation chamber located on an inner side of the fence; and second ventilation ports and third ventilation ports are respectively formed in a side wall and a top surface of the first ventilation chamber; and the furnace body comprises a limiting plate, when the furnace body is spliced with the base, the limiting plate is inserted between the fence and a side wall of the first ventilation chamber, a bottom end of the limiting plate is suspended, the limiting plate partially covers the first ventilation ports or is separated from the first ventilation ports or forms a gap with the fence, and the limiting plate partially covers the second ventilation ports or is separated from the second ventilation ports or forms a gap with the side wall of the first ventilation chamber;

wherein the furnace body comprises a limiting surface, and when the furnace body is spliced with the base, the limiting surface abuts against a top end of the fence.

2. The detachable secondary incinerator according to claim 1, wherein the furnace body is provided with a second ventilation chamber in a circumferential direction, fourth ventilation ports and fifth ventilation ports are respectively formed in the second ventilation chamber, the fourth ventilation ports are formed in the limiting surface, the fifth ventilation ports are formed in an upper part of an inner wall of the second ventilation chamber, and when the furnace body is spliced with the base, the fence is located at inner sides of the fourth ventilation ports.

3. The detachable secondary incinerator according to claim 2, wherein the furnace body and the base are both in a shape of an appropriate regular polygon, the first ventilation ports and the second ventilation ports are evenly arranged and equal in number in the fence and a side surface of the first ventilation chamber, or the furnace body and the base are both in a shape of an appropriate circle, and the first ventilation ports and the second ventilation ports are evenly arranged in a circumferential direction.

4. The detachable secondary incinerator according to claim 3, wherein a plurality of third ventilation ports are evenly and densely arranged in the top surface of the first ventilation chamber.

5. The detachable secondary incinerator according to claim 4, wherein a top of the furnace body is provided with a fireproof plate arranged obliquely to the inside.

6. The detachable secondary incinerator according to claim 1, wherein the furnace body is provided with a second ventilation chamber in a circumferential direction, fourth ventilation ports and fifth ventilation ports are respectively formed in the second ventilation chamber, the fourth ventilation ports are formed in a lower part of an outer wall of the second ventilation chamber, and the fifth ventilation ports are formed in an upper part of an inner wall of the second ventilation chamber.

7. The detachable secondary incinerator according to claim 6, further comprising partition plates, wherein the furnace body is surrounded and formed by the partition plates via end-to-end connection, and the second ventilation chamber is arranged inside the partition plates.

8. The detachable secondary incinerator according to claim 7, wherein the partition plate comprises an outer side wall, abutting walls are arranged on both sides of the partition plate, a connecting surface is arranged between the outer side wall and the abutting wall, the connecting surface and the abutting wall are perpendicular to each other, and the connecting surfaces on adjacent partition plates are coplanar.

\* \* \* \* \*